US009025329B2

(12) United States Patent
Sung (10) Patent No.: US 9,025,329 B2
(45) Date of Patent: May 5, 2015

(54) ELECTRONIC DEVICE (71) Applicant: Acer Incorporated, New Taipei (TW)

(72) Inventor: Pei-Yang Sung, New Taipei (TW)

(73) Assignee: Acer Incorporated, New Taipei (TW)

( * ) Notice: Subject to any disclaimer, the term of this patent is extended or adjusted under 35 U.S.C. 154(b) by 195 days.

(21) Appl. No.: 13/861,385

(22) Filed: Apr. 12, 2013

(65) Prior Publication Data

US 2014/0192460 A1 Jul. 10, 2014

(30) Foreign Application Priority Data

Jan. 8, 2013 (TW) .............................. 102100610 A (51) Int. Cl.
*H05K 5/02* (2006.01)
*G06F 1/16* (2006.01)

(52) U.S. Cl.
CPC ...................................... *G06F 1/162* (2013.01)

(58) Field of Classification Search
USPC ............. 361/679.55, 679.09, 679.58, 679.06, 361/679.27, 679.57, 679.07; 248/286.1, 248/923; 16/221, 320, 366; 349/58
See application file for complete search history.

(56) References Cited

U.S. PATENT DOCUMENTS

| 8,520,377 | B2 * | 8/2013 | Senatori | 361/679.27 |
| 2007/0030634 | A1 * | 2/2007 | Maskatia | 361/683 |
| 2011/0122594 | A1 | 5/2011 | Griffin | |
| 2013/0128443 | A1 * | 5/2013 | Tseng et al. | 361/679.12 |
| 2013/0329351 | A1 * | 12/2013 | Lin | 361/679.27 |
| 2014/0130303 | A1 * | 5/2014 | Liao et al. | 16/319 |

FOREIGN PATENT DOCUMENTS

| CN | 201902090 U | 7/2011 |
| TW | 201232228 | 8/2012 |

* cited by examiner

*Primary Examiner* — Robert J Hoffberg
*Assistant Examiner* — Michael Matey
(74) *Attorney, Agent, or Firm* — Jianq Chyun IP Office (57) ABSTRACT An electronic device includes a first body, a supporting arm, at least one first hinge, a first coupling member and at least one second coupling member. The first hinge is connected between the first body and the supporting arm. The supporting arm can rotate relatively to the first body through the first hinge. The first coupling member is disposed in the first body. The second coupling member is disposed in the supporting arm. When the second coupling member moves to at least one predetermined position, the first coupling member and the second coupling member are attracted by each other.

7 Claims, 7 Drawing Sheets

ELECTRONIC DEVICE

CROSS-REFERENCE TO RELATED APPLICATION

This application claims the priority benefit of Taiwan application serial no. 102100610, filed on Jan. 8, 2013. The entirety of the above-mentioned patent application is hereby incorporated by reference herein and made a part of this specification.

BACKGROUND OF THE INVENTION

1. Field of the Invention

The invention generally relates to an electronic device, and more particularly, to an electronic device using a coupling member to provide the body with supporting action.

2. Description of Related Art

Portable computing devices such as handheld computers, portable computers, notebook computers, tablet PCs and personal digital assistants (PDAs) have been more and more popular. Generally speaking, a portable computing device will use a base unit and a display assembly following the configuration of the base unit, so as to meet the requirement for the user to operate and view. Especially today, the touch display technology is developed day by day. As a result, for a portable computer, the touch screen has gradually become a basic allocation hardware.

Taking a notebook computer as an example, there is hinges serving as mechanism in charge of the motion between two bodies of the notebook computer. Once a touch screen is disposed however, after unfolding the two bodies, the pivot shaft must provide enough support for the user to apply forces on the touch screen meanwhile to make touch operation. The conventional hinge structure however is unable to support the rotation convenience and the stability during touch operation, thus, it is often to produce shake while the user is touching the screen, which leads to operation difficulty.

SUMMARY OF THE INVENTION

Accordingly, the invention is directed to an electronic device with better stability after unfolding the bodies thereof.

The invention provides an electronic device, which includes a first body, a supporting arm, at least one first hinge, a first coupling member and at least one second coupling member. The first hinge is connected between the first body and the supporting arm. The supporting arm can rotate relatively to the first body through the first hinge. The first coupling member is disposed in the first body. The second coupling member is disposed in the supporting arm. When the second coupling member moves to at least one predetermined position, the first coupling member and the second coupling member are attracted by each other.

Based on the description above, in the above-mentioned embodiment of the invention, the electronic device employs the first coupling member disposed in the first body, while the second coupling member is employed and disposed in the supporting arm. Therefore, when the second coupling member rotates with the supporting arm relatively to the first body through the first hinge, and the second coupling member arrives at a predetermined position, the first coupling member and the second coupling member are attracted by each other. In this way, when the supporting arm spreads to get a predetermined angle, the mutual attraction between the first coupling member and the second coupling member can provide the supporting arm with an additional supporting action to make the supporting aim have better stability and avoid the supporting arm from shaking or waving under an external force.

In order to make the features and advantages of the present invention more comprehensible, the present invention is further described in detail in the following with reference to the embodiments and the accompanying drawings.

DESCRIPTION OF THE EMBODIMENTS

Figure 1:
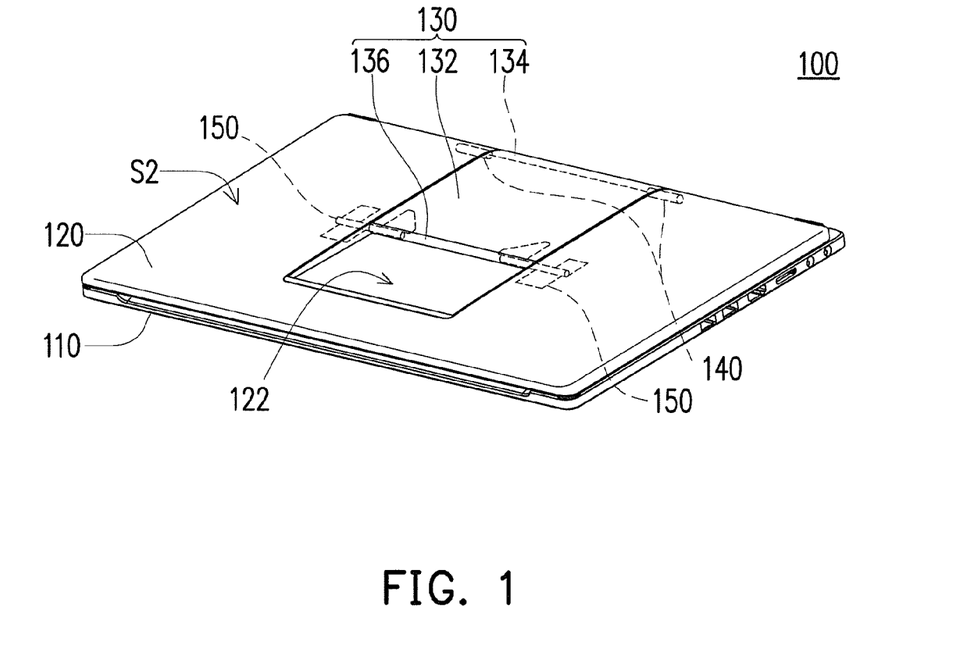
FIG. 1 is a schematic diagram of an electronic device according to an embodiment of the invention.
Figure 2:
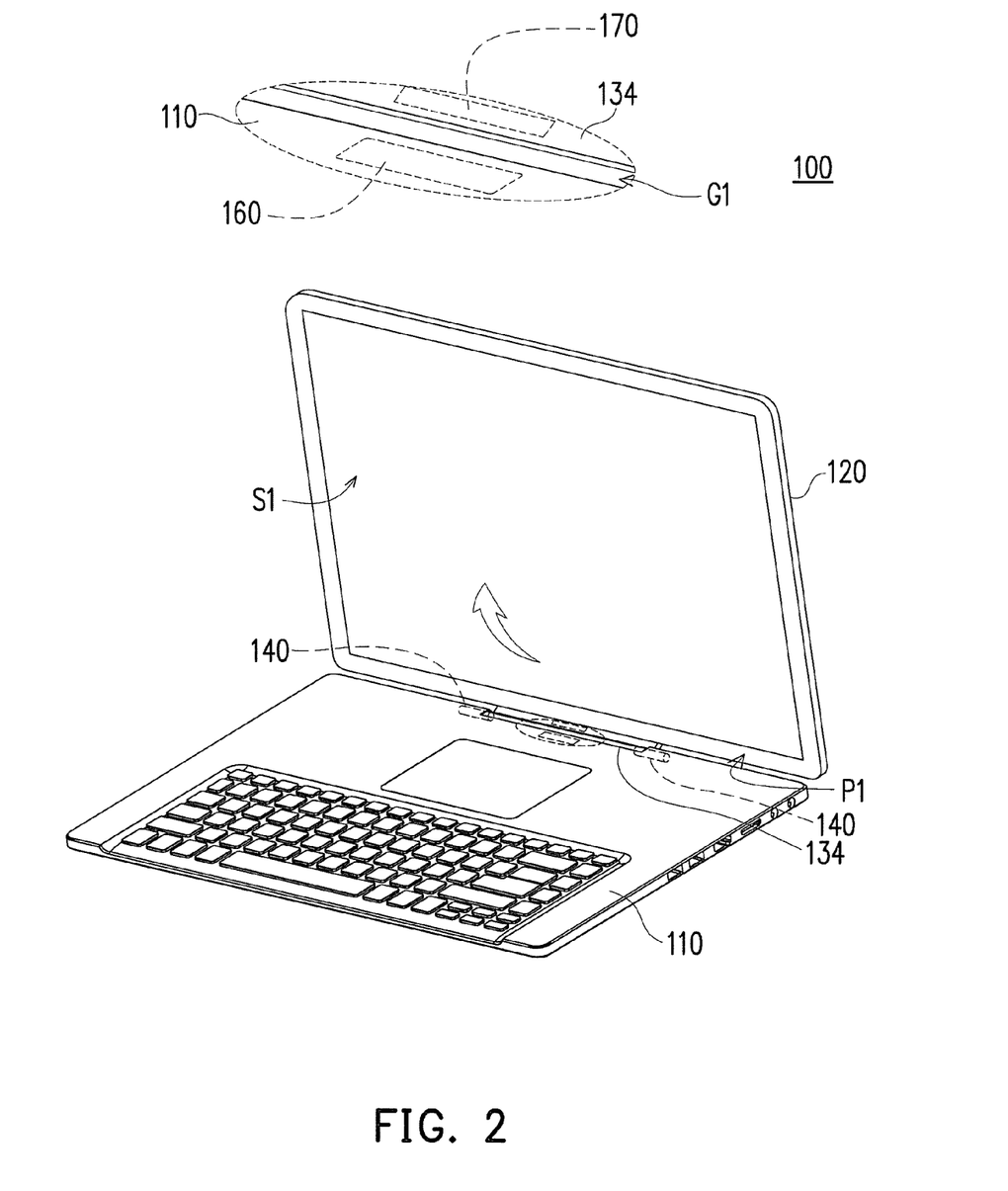
FIGS. 2 and 3 respectively show another two different states of the electronic device in FIG. 1.
Figure 3:
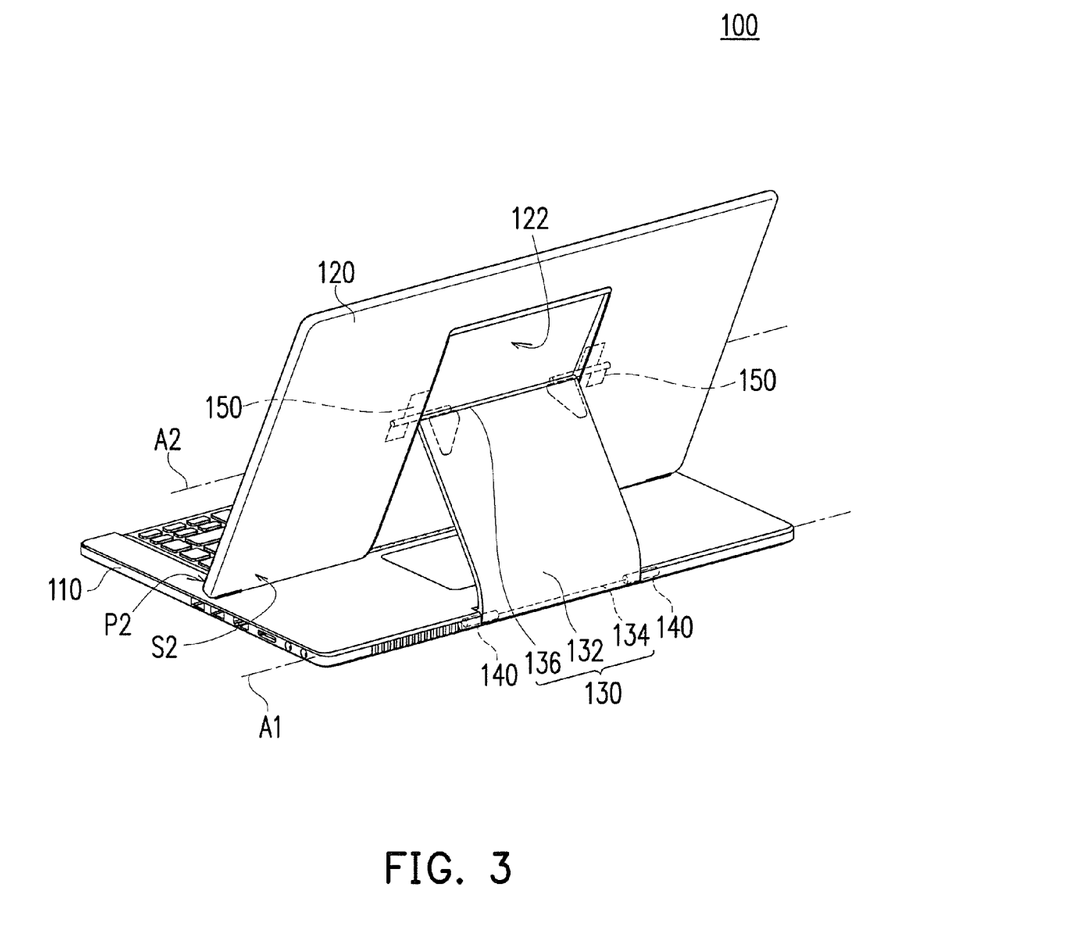

FIG. 1 is a schematic diagram of an electronic device according to an embodiment of the invention and FIGS. 2 and 3 respectively show another two different states of the electronic device in FIG. 1. Referring to FIGS. 1-3, in the embodiment, the electronic device 100 is, for example, a notebook computer and has a first body 110, a second body 120, a supporting arm 130, a first hinge 140 and a second hinge 150, in which the first body 110 is, for example, a host of a notebook computer, the second body 120 is, for example, a displaying component of the notebook computer. In particular, the displaying component is a touch displaying component having a touch surface S1 and a back surface S2 opposite to each other, such that the user can touch the touch surface S1 for operating the electronic device 100.

The supporting arm 130 includes a body 132, a first shaft 134 and a second shaft 136, in which the first shaft 134 and the second shaft 136 are located at the opposite two sides of the body 132. The first hinges 140 are respectively connected between the opposite two ends of the first shaft 134 and the first body 110 in pairs, and the first hinges 140 are coaxial with the first shaft 134. Further, the second body 120 has a recess 122 at the back surface S2 thereof, the second shaft 136 is located in the recess 122, and the second hinges 150 are respectively connected between the opposite two ends of the second shaft 136 and the second body 120 in pairs, and the second hinges 150 are coaxial with the second shaft 136. Thus, the first body 110, the supporting arm 130 and the second body 120 can rotate relatively to each other about a first axis A1 (the first shaft 134 is coaxial with the first hinge 140 along the first axis A1) and a second axis A2 (the second shaft 136 is coaxial with the second hinge 150 along the second axis A2).

Based on the above-mentioned layout, the electronic device 100 is able to change its state through the supporting arm 130 from a folding state of FIG. 1 to an unfolding state of FIGS. 2 and 3, as shown in FIGS. 1-3. Further, the first body 110 is able to move from a first position P1 shown by FIG. 2 to a second position P2 shown by FIG. 3 through the supporting arm 130 when the electronic device 100 is in the unfolding state, which allows the electronic device 100 to provide the user with more friendly and comfortable viewing angles, and in addition, allows the user to adjust the first body 110 to stay at any position between the first position P1 and the second position P2 so as to choose an appropriate viewing angle.

Figure 4:
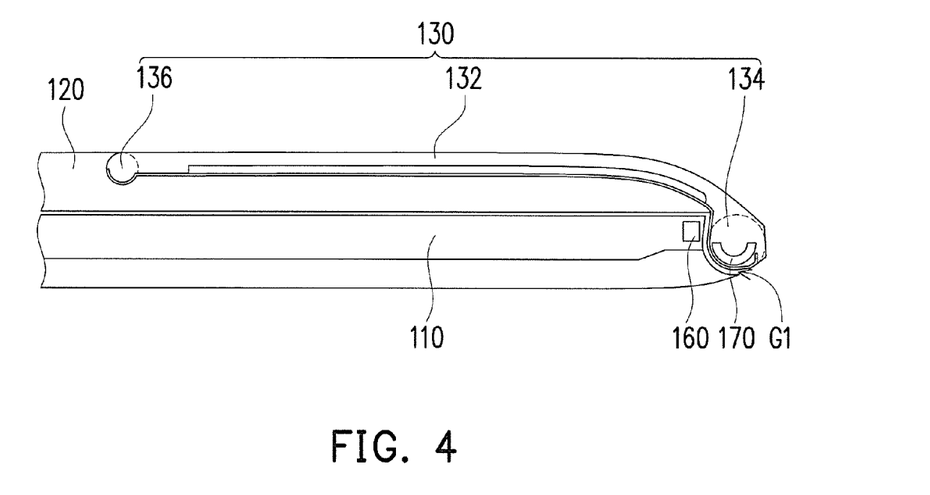
FIGS. 4-6 are cross-sectional diagrams respectively corresponding to the electronic devices of FIGS. 1-3.
Figure 5:
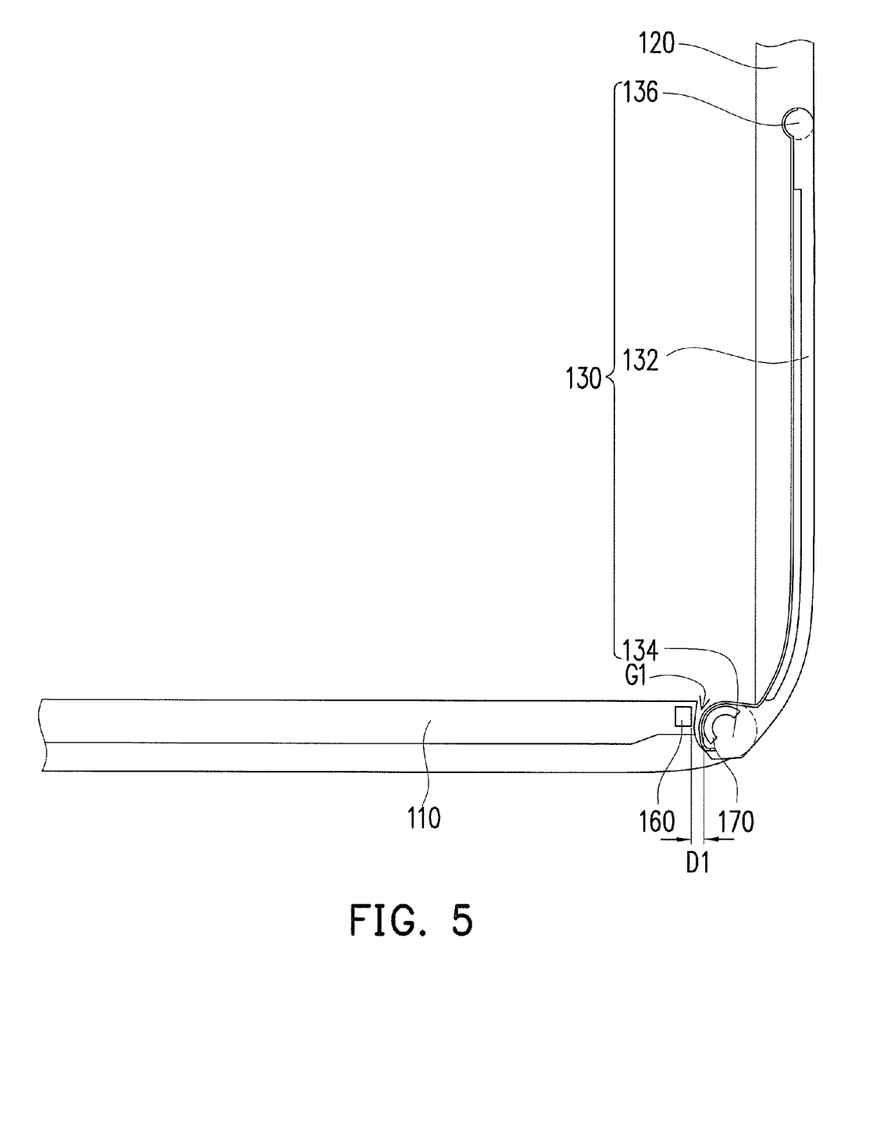
Figure 6:
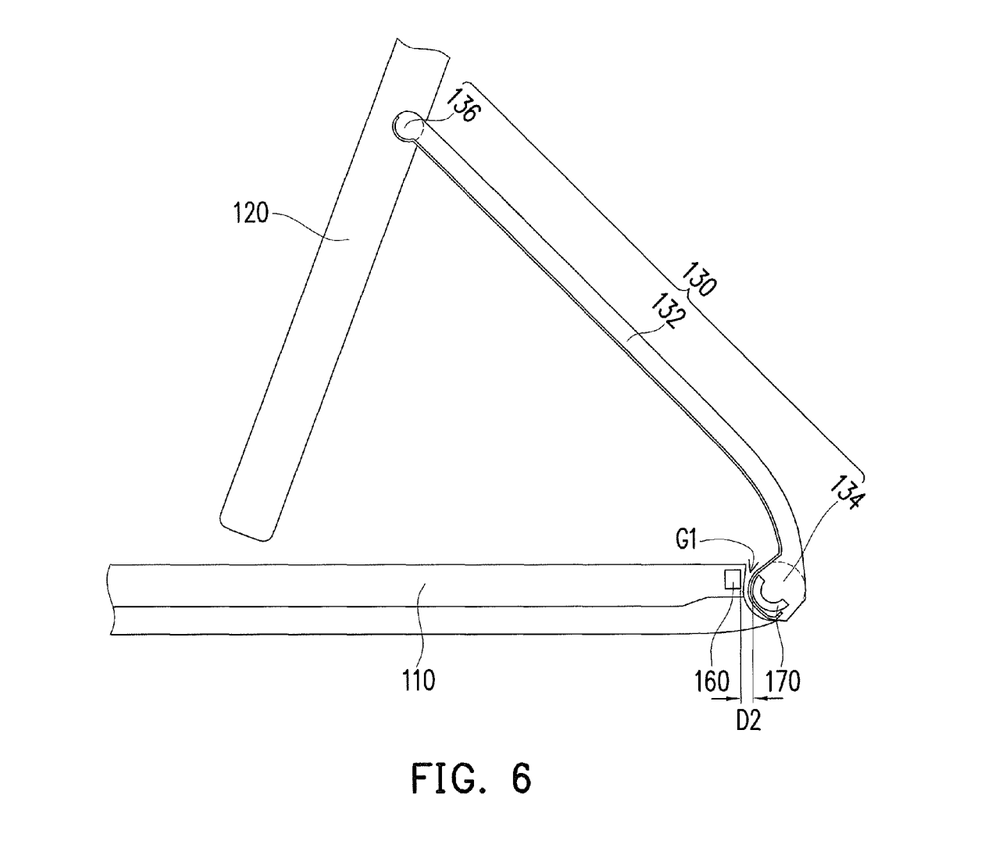

FIGS. 4-6 are cross-sectional diagrams respectively corresponding to the electronic devices of FIGS. 1-3. Referring to FIGS. 4-6, it should be noted that in order to make the supporting arm 130 provide an action enough to support the first body 110 without being shaking or waving when the user touches the touch screen of the first body 110 for the unfolding state of the electronic device 100 (shown by FIG. 2 or 3), the electronic device 100 of the invention further includes a first coupling member 160 and a second coupling member 170, in which the first coupling member 160 is disposed in the first body 110 and the second coupling member 170 is disposed at the first shaft 134 of the supporting arm 130.

Moreover, the first coupling member 160 in the embodiment is disposed at a position of the first body 110 close to the first shaft 134. There is a gap G1 between the first shaft 134 and the first body 110 (as shown in FIG. 2) to allow the first coupling member 160 and the second coupling member 170 located at the opposite two sides of the gap G1 (as shown by the partial enlargement diagram in FIG. 2). In addition, the first shaft 134 is, for example, a hollow structure, and the second coupling member 170 is disposed on the inner-wall of the hollow structure but opposite to the first coupling member 160 across the first shaft 134 and the gap G1. However, the embodiment does not limit the position of the second coupling member 170 on the first shaft 134.

Along with the supporting arm 130 rotates relatively to the first body 110, the second coupling member 170 rotates with the supporting arm 130 about the first axis A1 of the first shaft 134 as shown in FIG. 3, which makes the second coupling member 170 far away from or close to the first coupling member 160. When the first coupling member 160 and the second coupling member 170 are close to each other, both of them are attracted by each other. In order to achieve the above-mentioned attracting effect by each other, the first coupling member 160 and the second coupling member 170 can be respectively a magnetic element with mutual magnetic attraction. In another unshown embodiment, it allows only one of the first coupling member and the second coupling member is a magnetic element, while the other one is a magneto-conductive element; in yet another unshown embodiment, it allows both the first coupling member and the second coupling member are electromagnetic elements, where the two electromagnetic elements are controlled by a circuit system of the electronic device so as to produce a mutual magnetic attraction when the supporting arm is spread relatively to the first body to a predetermined angle.

In following, the corresponding relationships between the first coupling member 160 and the second coupling member 170 when the electronic device changes its motion state from FIG. 4 to FIG. 6 are explained.

Referring to FIG. 4, the electronic device 100 at the time is in a folding state where it's impossible to allow the user to touch the screen, therefore, the second coupling member 170 on the first shaft 134 is far away from the first coupling member 160.

Referring to FIG. 5, the supporting arm 130 is spread relatively to the first body to 90° state (at the time, the state of the second body 120 is not limited so that the second body 120, same as the supporting arm 130, and the first body 110 can keep an included angle of 90° as shown by FIG. 2 or the second body 120 can rotate relatively to the supporting arm 130 to be in an inclination state as shown by FIG. 3). At the time, the user is able to touch the screen on the second body 120, so that the first coupling member 160 and the second coupling member 170 can be attracted by each other and the first coupling member 160 is separated from the second coupling member 170 by a first coupling distance D1.

Referring to FIG. 6, the supporting arm 130 is spread relatively to the first body 110 to 45° state. Similar to FIG. 5, at the time, the user is able to touch the screen on the second body 120, so that the first coupling member 160 and the second coupling member 170 keep to be attracted by each other and the first coupling member 160 is separated from the second coupling member 170 by a second coupling distance D2.

It can be seen from FIGS. 4-6, when the supporting arm 130 in the electronic device 100 is spread relatively to the first body 110 to an angle range of 45°-90°, it is needed to increase the support of the supporting arm 130 to respond the touch operation of the user on the second body 120. Therefore, within the angle range of 45°-90°, the first coupling member 160 and the second coupling member 170 should be attracted by each other to provide the supporting arm 130 with more supporting, so that the supporting arm 130 in the state can use the pair of first hinges 140 connecting the opposite two ends of the body 132 and both the first coupling member 160 and the second coupling member 170 with mutual attraction and located between the pair of first hinges 140 to serve as supporting points to effectively increase the stability of the supporting arm 130.

It also can be seen from FIGS. 4-6 that since the supporting arm 130 rotates about the first axis A1 of the first shaft 134, in order to increase the motion efficiency of the second coupling member 170 disposed on the first shaft 134 that the unfolding/folding of the supporting arm 130 relatively to the first body 110 should be corresponding to the mutual attraction or not between the first coupling member 160 and the second coupling member 170, the section of the second coupling member 170 in the embodiment is in at least a partial circle profile for example, in a semi-circle shape as shown by the figure. Under the design, the second coupling member 170 can rotate, same as the supporting arm 130, about the first axis A1, and when the supporting arm 130 unfolds/folds relatively to the first body 110 within the angle range of 45°-90°, correspondingly, the first coupling member 160 and the second coupling member 170 are attracted by each other, and at the time, the first coupling distance D1 is equal to the second coupling distance D2.

The embodiment does not limit the unfolding/folding angle of the supporting arm 130 relatively to the first body 110, the designer can adjust the profile of the second coupling member 170 depending on the application condition. For example, the section profile of the second coupling member is made to be three fourth of a whole circle so as to increase the mutual attraction angle range between the first coupling member and the second coupling member. In addition, the above-mentioned first coupling distance D1 and second coupling distance D2 can be adjusted such that the first coupling member and the second coupling member have different attractive forces therebetween.

Figure 7:
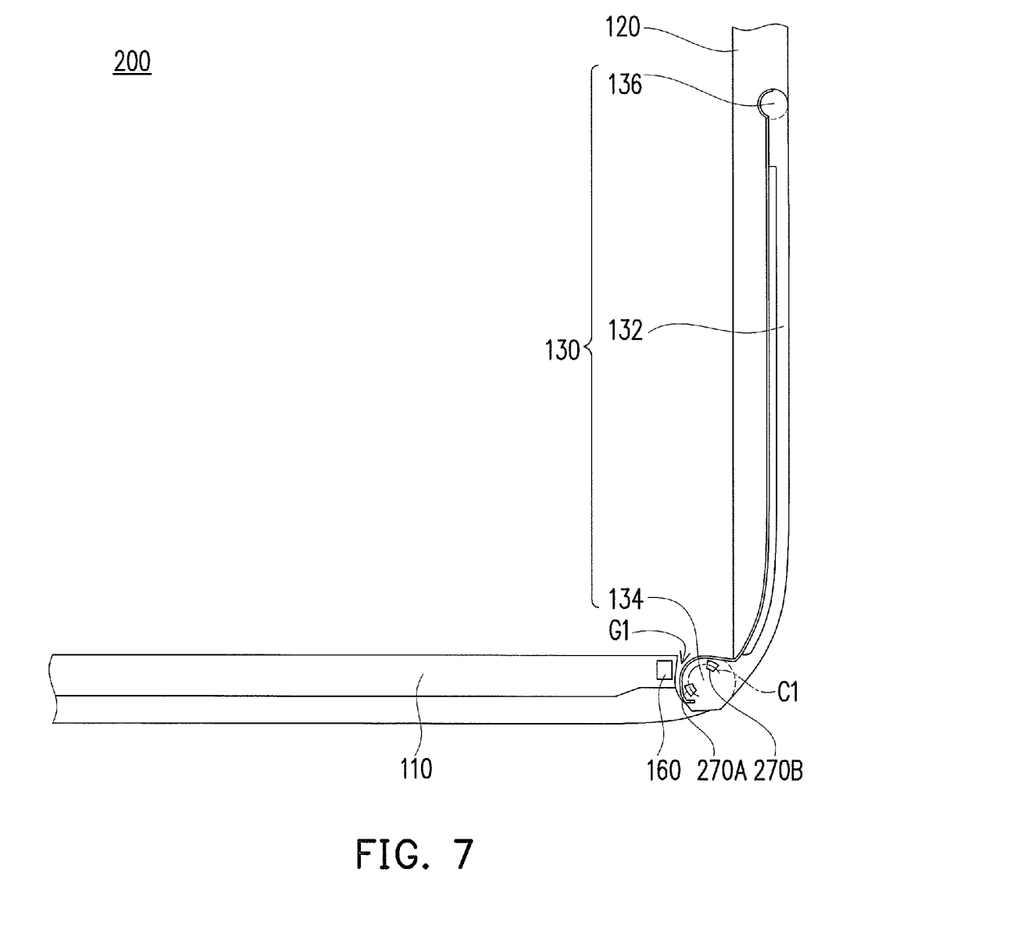
FIG. 7 is a partial cross-sectional diagram of an electronic device according to another embodiment of the invention.

FIG. 7 is a partial cross-sectional diagram of an electronic device according to another embodiment of the invention. Referring to FIG. 7, different from the above-mentioned embodiments, an electronic device 200 includes a pair of second coupling members 270A and 270B, which are respectively disposed at the first shaft 134 to rotate about the first axis A1 of the first shaft 134 (shown in FIG. 3). The pair of second coupling members 270A and 270B keep an interval and located on a same circle path C1, so that when the second coupling members 270A and 270B respectively move to the predetermined positions corresponding to the first coupling member 160, the second coupling members 270A and 270B and the first coupling member 160 are respectively attracted by each other. In the embodiment, only within a specific angle range, the supporting arm 130 can obtain the supporting action produced by the mutual attraction between the first coupling member 160 and the second coupling members 270A and 270B respectively. A pair of second coupling members 270A and 270B are shown in the embodiment, but the designer can employ a plurality of second coupling members on a same circle path C1 in other embodiments depending on the application condition to serve as a support for the supporting arm to be spread to the corresponding angles.

In summary, in the above-mentioned embodiments of the invention, the electronic device employs the first coupling member disposed in the first body, while the second coupling member is employed and disposed in the supporting arm. Therefore, when the second coupling member rotates with the supporting arm relatively to the first body through the first hinge, and the second coupling member arrives at a predetermined position, the first coupling member and the second coupling member are attracted by each other. In this way, when the supporting arm spreads to get a predetermined angle, the mutual attraction between the first coupling member and the second coupling member can provide the supporting arm with an additional supporting action to make the supporting arm have better stability and avoid the supporting arm from shaking or waving under an external force.

In addition, by adjusting the profile, the disposing position and the quantity of the second coupling members, the designer can realize the mutual attraction between the first coupling member and the second coupling member when the supporting arm is within predetermined angles only depending on the application condition, which correspondingly produces the supporting action on the supporting arm depending on the included angle between the supporting arm and the first body. As a result, the invention enables the supporting arm having both rotation smoothness and touching stability.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:
1. An electronic device, comprising:
a first body;
a second body;
a supporting arm comprising a supporting body, first shaft, and a second shaft, the first shaft and the second shaft are located at two opposite sides of the supporting body;
at least one first hinge connected between the first body and the supporting arm, wherein the supporting arm can rotate relatively to the first body through the at least one first hinge;
a second hinge connected between the second shaft and the second body;
a first coupling member, disposed in the first body; and
at least one second coupling member, disposed in the supporting arm, wherein when the at least one second coupling member moves to at least one predetermined position, the first coupling member and the at least one second coupling member are a pair of magnetic elements with mutual magnetic attraction,
wherein the supporting arm has the first shaft coaxially connected to the at least one first hinge, the at least one second coupling member is disposed on the first shaft and rotates with the supporting arm about an axis of the first shaft, and wherein the second body rotates relative to the supporting arm by the second hinge.

2. The electronic device as claimed in claim 1, wherein a cross-section of the at least one second coupling member has at least a partial circle profile.

3. The electronic device as claimed in claim 1, wherein the at least one first hinge is a pair of first hinges, and each of the pair of first hinges is connected between one end of the first shaft and the first body, wherein the first coupling member and the at least one second coupling member are located between the pair of first hinges.

4. The electronic device as claimed in claim 3, wherein there is a gap between the first shaft and the first body, and the first coupling member and the at least one second coupling member are located at two opposite sides of the gap.

5. The electronic device as claimed in claim 1, wherein the at least one second coupling member is a pair of second coupling members disposed on the first shaft and rotating about the axis of the first shaft, wherein the pair of second coupling members keep an interval therebetween and located on a same circle path so that the pair of second coupling members respectively move to a predetermined position where the pair of second coupling members and the first coupling member are respectively magnetically attracted by each other.

6. The electronic device as claimed in claim 1, wherein the at least one second coupling member is a magneto-conductive element.

7. The electronic device as claimed in claim 1, wherein at least one of the first coupling member and the at least one second coupling member is an electromagnetic element.

* * * * *